(No Model.)
J. M. JONES.
HAND CART.
No. 258,074.  Patented May 16, 1882.
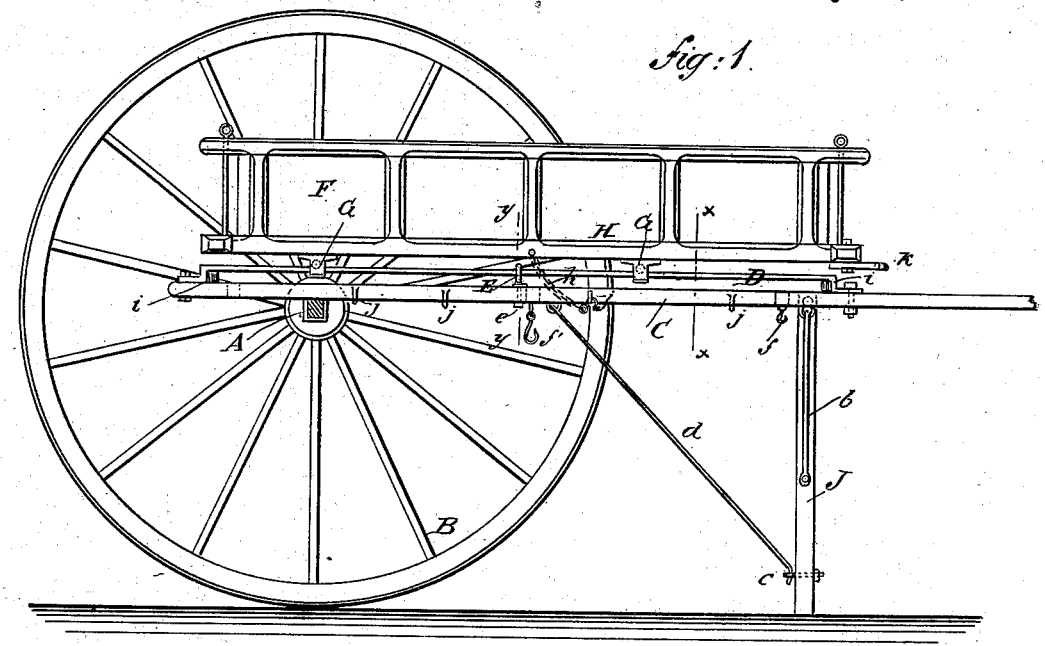
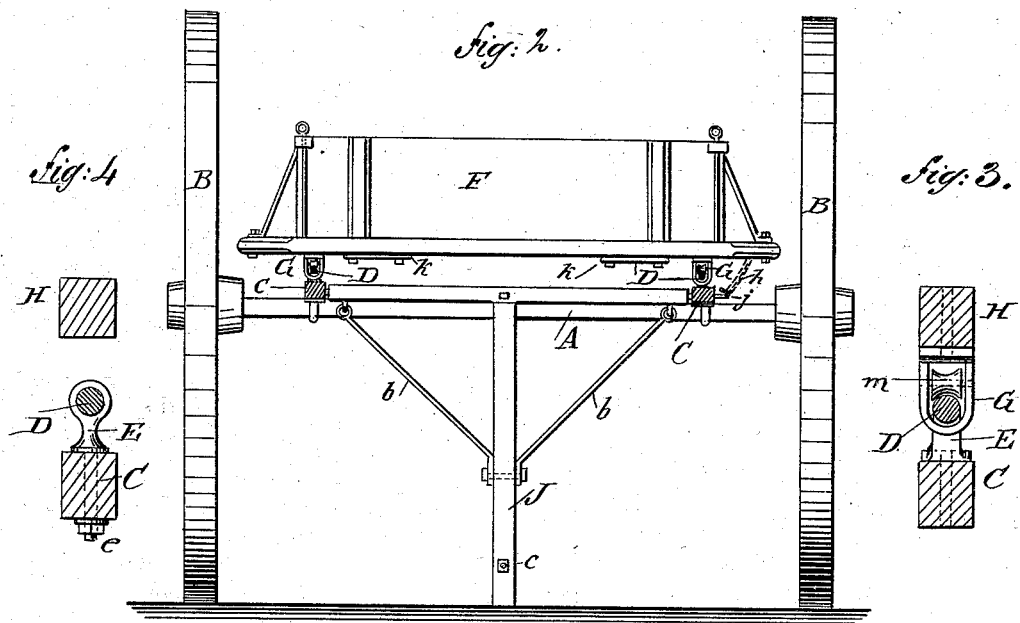
WITNESSES:
Chas. Nida
C. Sedgwick
INVENTOR:
J. M. Jones
BY
ATTORNEYS.

UNITED STATES PATENT OFFICE.

JOSEPH M. JONES, OF PARIS, KENTUCKY.

HAND-CART.

SPECIFICATION forming part of Letters Patent No. 258,074, dated May 16, 1882.

Application filed December 2, 1881. (No model.)

*To all whom it may concern:*

Be it known that I, JOSEPH M. JONES, of Paris, in the county of Bourbon and State of Kentucky, have invented a new and useful Improvement in Hand-Carts, of which the following is a full, clear, and exact description.

This invention relates to hand-carts which have shifting bodies, and is an improvement upon Letters Patent No. 163,078, which were granted to me May 11, 1875; and my invention consists in providing the body or box of the cart with friction-rollers, which support the body upon the runners and facilitate its movement thereon; in providing suitable bumpers at the ends of the runners; in providing hooked chains and suitable eyes or rings for securing the body in any desired position; in supporting the runners at or near their centers to prevent them sagging under the load; in the hinged standard or support braced at the sides and at the rear from the center of the frame of the cart; and in providing the front of the body of the cart with suitable grasps or handles for moving the body to different positions along the runners.

Reference is to be had to the accompanying drawings, forming a part of this specification, in which similar letters of reference indicate corresponding parts in all the figures.

Figure 1 is a side elevation of my improved hand-cart, one of the wheels being removed. Fig. 2 is a front elevation of the same. Fig. 3 is a detailed section taken on the line *x x* of Fig. 1, and Fig. 4 is also a detailed section taken on the line *y y* of Fig. 1.

The axle A of the cart and the wheels B B are of the ordinary construction, and the side bars, C C, of the frame of the cart are provided with the runners D D, and are secured upon the axle in the same manner as shown and described in the patent above referred to, except that the runners are supported in the center by the eyebolts E E, which are slipped upon the runners and pass through the side bars, and receive the nuts *e e* upon their lower ends under the said bars, as shown clearly in Figs. 1 and 4. These supports prevent the runners from sagging when the box or body F is heavily loaded. The box or body F is secured to the runners D D by means of the sleeves or clips G G, which are securely bolted to the side corner-rails, H H, of the body or box, and through which the runners D D pass. Within these sleeves or clips are journaled the concaved friction-wheels *m*, which bear upon the runners and support the body or box, and facilitate the movement of the box or body to different positions along the runners. At the ends of the runners I place the rubber buffers *i i*, which prevent the sleeves or clips coming in contact with the runners and causing unnecessary jar and noise when the box or body is moved to the ends of the runners.

To secure the body or box in any desired position along the runners, I provide the same with the chains *h h*, and the side bars, C C, with the rings, hooks, or eyes *j j*, in which the hook of the chains or the chains themselves may be hooked or fastened for holding the body; and for moving the body or box along the runners I provide the forward end of the body or box with the handles or hand-grasps *k k*, as shown in Figs. 1 and 2 of the drawings.

The standard or support J for supporting the body when not in use is T-shaped, and is hinged between the side bars, C C, as shown, and is supported or braced at its sides by the side braces *b b*, and from the rear by the hooked brace or rod *d*, which is hinged to the bottom of the body or box, and is adapted, when the support is let down for supporting the cart, to hook into the eye *c* in the lower end of the standard or support, as shown in Fig. 1. When the cart is in use for moving a load this rod or brace will be placed in the hooks *f*, secured to the forward cross-piece of the frame, and the standard or support J will be swung back and placed in the hook *f'*, which is secured to the central cross-piece of the frame.

Having thus described my invention, I claim as new and desire to secure by Letters Patent—

1. The body or box F, provided with the clips or sleeves G, having the rollers *m*, in combination with the runners D on the side bars of the frame, substantially as and for the purposes set forth.

2. The buffers *i i*, in combination with the runners D and the sliding box or body F, substantially as and for the purposes set forth.

3. The sliding box or body F, provided with the chains $h$, in combination with the eyes, ring, or hooks $j$, secured to the side bars, C, of the frame, substantially as and for the purposes set forth.

4. In hand-carts, the runners D D, supported in the center by the bolts or similar device E, substantially as and for the purposes set forth.

5. In hand-carts, the hinged support or standard J, braced at the sides by the braces $b$ $b$ and from the rear by the hooked rod $d$, the rod being adapted to be placed in the hook $f$ and the standard to be placed in the hook $f'$, substantially as and for the purposes set forth.

6. The sliding box or body F, provided with the handles or hand-grasps $k$, substantially as and for the purposes set forth.

JOSEPH MATTHIAS JONES.

Witnesses:
J. B. HALLADAY,
WM. LAYTON.